(12) United States Patent
Xu et al.

(10) Patent No.: US 11,228,269 B2
(45) Date of Patent: Jan. 18, 2022

(54) ARBITRARY DOUBLE VECTOR MODEL PREDICTIVE THRUST CONTROL METHOD FOR LINEAR INDUCTION MOTOR AND DRIVE SYSTEM

(71) Applicant: HUAZHONG UNIVERSITY OF SCIENCE AND TECHNOLOGY, Hubei (CN)

(72) Inventors: Wei Xu, Hubei (CN); Jianqiao Zou, Hubei (CN); Yi Liu, Hubei (CN); Dinghao Dong, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 0 days.

(21) Appl. No.: 16/640,723

(22) PCT Filed: Aug. 29, 2019

(86) PCT No.: PCT/CN2019/103205
§ 371 (c)(1),
(2) Date: Feb. 20, 2020

(87) PCT Pub. No.: WO2020/173064
PCT Pub. Date: Sep. 3, 2020

(65) Prior Publication Data
US 2021/0143764 A1    May 13, 2021

(30) Foreign Application Priority Data

Feb. 28, 2019   (CN) .......................... 201910151931.4

(51) Int. Cl.
*H02P 25/062*    (2016.01)
*H02P 21/16*    (2016.01)
*H02P 21/13*    (2006.01)

(52) U.S. Cl.
CPC ............ *H02P 25/062* (2016.02); *H02P 21/13* (2013.01); *H02P 21/16* (2016.02)

(58) Field of Classification Search
CPC .......... H02P 25/062; H02P 6/006; H02P 7/02; H02P 8/005; H02P 21/0003; H02P 21/13; H02P 21/16; H02P 23/0004
See application file for complete search history.

(56) References Cited

U.S. PATENT DOCUMENTS

| | | | |
|---|---|---|---|
| 9,231,512 B2 * | 1/2016 | Gao | ...................... G01R 31/343 |
| 2014/0333241 A1 * | 11/2014 | Zhao | ........................ H02P 6/08 318/400.02 |

(Continued)

OTHER PUBLICATIONS

J. Zou, W. Xu, Y. Liu and C. Mu, "Multistep model predictive control for permanent magnet synchronous machine," 2017 IEEE Applied Power Electronics Conference and Exposition (APEC), Tampa, FL, USA, 2017, pp. 525-531, doi: 10.1109/APEC.2017.7930744. (Year: 2017).*

*Primary Examiner* — Said Bouziane
(74) *Attorney, Agent, or Firm* — JCIPRNET

(57) ABSTRACT

The present disclosure provides an arbitrary double vector and model prediction thrust control method and system, which belongs to the technical field of linear induction motor control. The present disclosure combines a double vector modulation algorithm to improve the modulation accuracy, in which two voltage vectors are used in one cycle, so that the amplitude of the fluctuation can be reduced, thereby improving the running performance of the motor. The addition of the double vector modulation strategy increases the complexity of the algorithm, and the calculation process is too complicated. The present disclosure further proposes a simplified search process instead of the traditional repeated calculation and comparison method, which eliminates the need for a complex online calculation (Continued)

process, thereby simplifying the implementation process of the algorithm in the actual system.

3 Claims, 7 Drawing Sheets

(56) References Cited

U.S. PATENT DOCUMENTS

2017/0244344 A1* 8/2017 Aghili ................... H02P 6/15
2020/0409320 A1* 12/2020 El Shormbably ...... G05B 17/02
2021/0067077 A1* 3/2021 Zhou ................... H02P 27/06

* cited by examiner

ARBITRARY DOUBLE VECTOR MODEL PREDICTIVE THRUST CONTROL METHOD FOR LINEAR INDUCTION MOTOR AND DRIVE SYSTEM

CROSS-REFERENCE TO RELATED APPLICATION

This application is a 371 of international application of PCT application Ser. No. PCT/CN2019/103205, filed on Aug. 29, 2019, which claims the priority benefit of China application No. 201910151931.4, filed on Feb. 28, 2019. The entirety of each of the above mentioned patent applications is hereby incorporated by reference herein and made a part of this specification.

BACKGROUND

Technical Field

The present disclosure belongs to the technical field of linear induction motor control, and more particularly, relates to an arbitrary double vector and model prediction thrust control method and system.

Description of the Related Art

Linear induction motors can directly output thrust to generate linear motion. Therefore, the linear induction motors have been widely used in urban rail transportation in recent years. Compared with traditional subways driven by rotating motors, the linear induction motors have the advantages of strong climbing ability, small turning radius, flexible route selection, and low engineering cost. Due to the special magnetic circuit structure of breaking at two ends of the linear induction motor, the end effect is generated, the mutual inductance of the linear induction motor changes drastically, and the thrust attenuation is more serious at high speed. In traditional control strategies such as vector control and direct torque control, influence of the end effect is not taken into account, resulting in insufficient motor operating performance, especially serious output thrust attenuation of the motor at a high speed.

In order to study effective control strategies to improve the performance of the linear induction motor, a model prediction control algorithm can be combined with a direct thrust control strategy. Firstly, the model prediction control algorithm, which is based on the equivalent circuit model of the linear motor proposed by previous scholars, can modify the motor parameters with the influence of the end effect fully taken into account. Secondly, by directly controlling the thrust of the motor, the dynamic response speed is fast, thereby suppressing the attenuation of the motor thrust at a high speed as much as possible.

However, conventional model prediction thrust control algorithms use only one voltage vector in one switching cycle, which results in large fluctuations in thrust and flux linkage. In order to improve the performance of the algorithm, a double vector modulation strategy is combined with the model prediction thrust control algorithm, so that two voltage vectors are used in one switching cycle, thereby greatly reducing fluctuations in thrust and flux linkage with little increase in the switching frequency. However, since there are many combinations of two voltage vectors, which need to be evaluated and compared one by one, a heavy calculation burden is brought about, and in this case, a simplified method is needed to reduce the calculation amount of the algorithm.

SUMMARY

In view of the above-described defects or improvement requirements in the art, the present disclosure provides an arbitrary double vector and model prediction thrust control method and system, which further improving control performance and reducing thrust pulsation. This method combines the double vector modulation strategy with the model prediction thrust control algorithm to improve the modulation accuracy so as to reduce the fluctuations in thrust and flux linkage.

The present disclosure provides an arbitrary double vector and model prediction thrust control method for a linear induction motor, comprising following steps.

(1) Sampling a current and a running linear velocity of the linear induction motor at a current timing k.

(2) Predicting a thrust and a conjugate thrust of the linear induction motor at a current timing k+1 according to the sampled values at the current timing k.

(3) Solving an optimal voltage vector combination at the current timing k+1 by taking the predicted thrust and conjugate thrust of the linear induction motor at the current timing k as target values.

(4) Calculating an optimal duty cycle for the optimal voltage vector combination, and allocating pulses of three-phase bridge arms.

An equation for calculating the thrust and conjugate thrust of the linear induction motor is expressed as:

$$\begin{cases} F_{(k+1)} = \dfrac{3\pi}{2\tau}(\psi_{\alpha 1(k+1)} i_{\beta 1(k+1)} - \psi_{\beta 1(k+1)} i_{\alpha 1(k+1)}) \\ \overline{F_{(k+1)}} = \dfrac{3\pi}{2\tau}(\psi_{\alpha 1(k+1)} i_{\alpha 1(k+1)} + \psi_{\beta 1(k+1)} i_{\beta 1(k+1)}) \end{cases}, \text{wherein}$$

$$\begin{cases} i_{\alpha 1(k+1)} = \lambda T_s(R_2 \psi_{\alpha 1(k)} + L_r u_{\alpha 1(k)} + L_r \omega_2 \psi_{\beta 1(k)}) + \\ \qquad (1 - \lambda \gamma T_s) i_{\alpha 1(k)} - \omega_2 T_s i_{\beta 1(k)} \\ i_{\beta 1(k+1)} = \lambda T_s(R_2 \psi_{\beta 1(k)} + L_r u_{\beta 1(k)} - L_r \omega_2 \psi_{\alpha 1(k)}) + \\ \qquad (1 - \lambda \gamma T_s) i_{\beta 1(k)} + \omega_2 T_s i_{\alpha 1(k)} \\ \psi_{\alpha 1(k+1)} = \psi_{\alpha 1(k)} + (u_{\alpha 1(k)} - R_1 i_{\alpha 1(k)}) T_s \\ \psi_{\beta 1(k+1)} = \psi_{\beta 1(k)} + (u_{\beta 1(k)} - R_1 i_{\beta 1(k)}) T_s \end{cases},$$

$F_{(k+1)}$ represents the thrust of the linear induction motor, $\overline{F_{(k+1)}}$ represents the conjugate thrust of the linear induction motor, $R_1$ and $R_2$ represent primary and secondary resistances of the linear induction motor, respectively; $i_{\alpha 1}$ and $i_{\beta 1}$ represent α and β axis components of a primary current of the linear induction motor, respectively; $i_{\alpha 2}$ and $i_{\beta 2}$ represent α and β axis components of a secondary current of the linear induction motor, respectively; $\psi_{\alpha 1}$ and $\psi_{\beta 1}$ represent α and β axis components of a primary flux linkage of the linear induction motor, respectively; $\omega_2$ represents a secondary angular velocity; k and k+1 in parentheses of subscripts represent state variables of the linear induction motor at the current timings k and k+1, respectively;

$$\lambda = \frac{1}{L_s L_r - L_m'^2},$$

where $L_r$ represents a secondary inductance, $L_s$ represents a primary inductance, and $L'_m$ represents a modified mutual inductance of the linear induction motor; and $\tau$ represents a pole pitch of the linear induction motor.

Further, a solving process of the step (3) is as follows.

(31) Solving a reference voltage vector $V^*_{k+1}$:

$$\begin{cases} u^*_{\alpha 1(k+1)} = \dfrac{D(F^* - F_{(k+1)} - E_1 T_s) - B(\overline{F^*} - \overline{F_{(k+1)}} - E_2 T_s)}{(AD - BC)T_s} \\ u^*_{\beta 1(k+1)} = \dfrac{A(\overline{F^*} - \overline{F_{(k+1)}} - E_2 T_s) - C(F^* - F_{(k+1)} - E_1 T_s)}{(AD - BC)T_s} \end{cases},$$

wherein $$\begin{cases} A = \dfrac{3\pi}{2\tau}(i_{\beta 1(k+1)} - \lambda L_r \psi_{\beta 1(k+1)}) \\ B = -\dfrac{3\pi}{2\tau}(i_{\alpha 1(k+1)} - \lambda L_r \psi_{\alpha 1(k+1)}) \\ C = \dfrac{3\pi}{2\tau}(i_{\alpha 1(k+1)} + \lambda L_r \psi_{\alpha 1(k+1)}) \\ D = \dfrac{3\pi}{2\tau}(i_{\beta 1(k+1)} + \lambda L_r \psi_{\beta 1(k+1)}) \\ E_1 = -\dfrac{3\pi}{2\tau}\lambda L_r \omega_2 (\psi^2_{\alpha 1(k+1)} + \psi^2_{\beta 1(k+1)}) - \lambda \gamma F_{(k+1)} + \omega_2 \overline{F_{(k+1)}} \\ E_2 = -\dfrac{3\pi}{2\tau}[R_1(i^2_{\alpha 1(k+1)} + i^2_{\beta 1(k+1)}) + \lambda R_2(\psi^2_{\alpha 1(k+1)} + \psi^2_{\beta 1(k+1)})] - \lambda \gamma \overline{F_{(k+1)}} - \omega_2 F_{(k+1)} \end{cases},$$

$u^*_{\alpha 1(k+1)}$ represents a $\alpha$-axis component of the reference voltage vector $V^*_{k+1}$, $u^*_{\beta 1(k+1)}$ represents a $\beta$-axis component of the reference voltage vector $V^*_{k+1}$, $F^*$ represents a thrust reference value generated by a speed loop PI regulator, $\overline{F^*}$ represents a conjugate thrust reference value generated by a flux linkage loop PI regulator, $\gamma = L_s R_2 + L_r R_1$, and $T_s$ represents a sampling period; and

(32) Evenly dividing an output voltage range of a two-level inverter into multiple regions, and determining which region the reference voltage vector $V^*_{k+1}$ belongs to, thereby obtaining a voltage vector combination corresponding to the region, which is the optimal voltage vector combination.

Further, the step (4) of calculating the optimal duty cycle is implemented as follow.

Let the optimal voltage vector combination be expressed as $(V_i, V_j)$, then a calculation formula of the optimal duty cycle is:

$$d_{opt} = \frac{(V^*_{k+1} - V_j) \cdot (V_i - V_j)}{\|V_i - V_j\|^2},$$

wherein · represents a dot product between two voltage vectors, and $\|V\|$ represents a length of a voltage vector.

The present disclosure provides an arbitrary double vector and model prediction thrust control system for a linear induction motor, comprising a speed loop PI regulator, a flux linkage loop PI regulator and a controller, wherein the speed loop PI regulator is configured to generate a thrust reference value, the flux linkage loop PI regulator and the controller are configured to generate a conjugate thrust reference value, and the controller is configured to perform the above method.

In general, by comparing the above technical solution of the present inventive concept with the prior art, the present disclosure has the following beneficial effects:

1. This method eliminates the complex setting process of the weight coefficient, and combines the double vector modulation strategy, which can reduce the fluctuations in thrust and flux linkage during the motor operation.

2. Further, a simplified search method is proposed, in which an optimal voltage vector combination is searched through a table lookup method, which greatly reduces the online calculation of the algorithm and allows the arbitrary double vector modulation strategy to be used in practical applications.

DETAILED DESCRIPTION OF THE EMBODIMENTS

For clear understanding of the objectives, features and advantages of the present disclosure, detailed description of the present disclosure will be given below in conjunction with accompanying drawings and specific embodiments. It should be noted that the embodiments described herein are only meant to explain the present disclosure, and not to limit the scope of the present disclosure. Furthermore, the technical features related to the embodiments of the disclosure described below can be mutually combined if they are not found to be mutually exclusive.

First: Arbitrary Double Vector Thrust Predictive Control Algorithm

Figure 1:
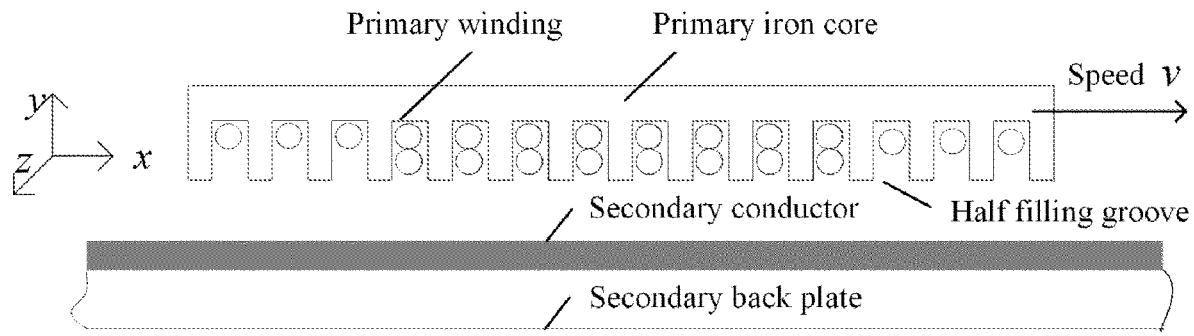
FIG. 1 is a schematic structural diagram of a linear induction motor.

Due to the iron core breaking structure, as shown in FIG. 1, an end effect is generated in the linear induction motor, which causes the mutual inductance to change during the motor operation. To describe this mutual inductance change, variables are defined as follows:

$$Q = \frac{DR_2}{v(L_{l2} + L_m)} \tag{1}$$

where D represents a primary length of the motor; v represents a linear velocity of the motor; $R_2$ represents a secondary resistance of the motor; $L_{l2}$ represents a secondary inductance of the motor; and $L_m$, represents a mutual inductance of the motor.

According to the above equation, an influence factor of the end effect of the motor can be expressed as:

$$f(Q) = \frac{1 - e^{-Q}}{Q} \qquad (2)$$

For the linear induction motor, the voltage equation can be expressed as:

$$\begin{cases} u_{\alpha 1} = R_1 i_{\alpha 1} + p\psi_{\alpha 1} \\ u_{\beta 1} = R_1 i_{\beta 1} + p\psi_{\beta 1} \\ 0 = R_2 i_{\alpha 2} + p\psi_{\alpha 2} + \omega_2 \psi_{\beta 2} \\ 0 = R_2 i_{\beta 2} + p\psi_{\beta 2} - \omega_2 \psi_{\alpha 2} \end{cases} \qquad (3)$$

The flux linkage equation can be expressed as:

$$\begin{cases} \psi_{\alpha 1} = L_{l1} i_{\alpha 1} + L_m[1 - f(Q)](i_{\alpha 1} + i_{\alpha 2}) \\ \psi_{\beta 1} = L_{l1} i_{\beta 1} + L_m[1 - f(Q)](i_{\beta 1} + i_{\beta 2}) \\ \psi_{\alpha 2} = L_{l2} i_{\alpha 2} + L_m[1 - f(Q)](i_{\alpha 1} + i_{\alpha 2}) \\ \psi_{\beta 2} = L_{l2} i_{\beta 2} + L_m[1 - f(Q)](i_{\beta 1} + i_{\beta 2}) \end{cases} \qquad (4)$$

where p represents a differential operator; $u_{\alpha 1}$ and $u_{\beta 1}$ represent $\alpha$ and $\beta$ axis components of the primary input voltage of the motor, respectively; $R_1$ and $R_2$ represent primary and secondary resistances of the motor, respectively; $i_{\alpha 1}$ and $i_{\beta 1}$ represent $\alpha$ and $\beta$ axis components of the primary current of the motor, respectively; $i_{\alpha 2}$ and $i_{\beta 2}$ represent $\alpha$ and $\beta$ axis components of the secondary current of the motor, respectively; $\psi_{\alpha 1}$ and $\psi_{\beta 1}$ represent $\alpha$ and $\beta$ axis components of the primary flux linkage of the motor, respectively; $\psi_{\alpha 2}$ and $\psi_{\beta 2}$ represent $\alpha$ and $\beta$ axis components of the secondary flux linkage of the motor, respectively; $L_{l1}$ and $L_{l2}$ represent primary and secondary leakage inductances of the motor, respectively; $L_m$, represents a mutual inductance between the primary and secondary phases of the motor, respectively; and $\omega_2$ represents a secondary angular velocity.

In order to conveniently describe the primary flux linkage and output thrust variables of the motor, state variables $[i_{\alpha 1} \; i_{\beta 1} \; \psi_{\alpha 1} \; \psi_{\beta 1}]^T$ of the motor are selected and combined with the equations (3) and (4), and the state equation of the motor can be expressed as:

$$\begin{cases} \frac{di_{\alpha 1}}{dt} = \lambda(R_2 \psi_{\alpha 1} - \gamma i_{\alpha 1} + L_r u_{\alpha 1} + L_r \omega_2 \psi_{\beta 1}) - \omega_2 i_{\beta 1} \\ \frac{di_{\beta 1}}{dt} = \lambda(R_2 \psi_{\beta 1} - \gamma i_{\beta 1} + L_r u_{\beta 1} - L_r \omega_2 \psi_{\alpha 1}) + \omega_2 i_{\alpha 1} \\ \frac{d\psi_{\alpha 1}}{dt} = u_{\alpha 1} - R_1 i_{\alpha 1} \\ \frac{d\psi_{\beta 1}}{dt} = u_{\beta 1} - R_1 i_{\beta 1} \end{cases} \qquad (5)$$

where the secondary inductance $L_r = L_{l2} + L_m[1 - f(Q)]$, the primary inductance $L_s = L_{l1} + L_m[1 - f(Q)]$, the revised motor mutual inductance $$L'_m = L_m[1 - f(Q)], \; \lambda = \frac{1}{L_S L_r - L'^2_m}, \; \text{and} \; \gamma = L_S R_2 + L_r R_1.$$

An output thrust of the motor can be expressed as:

$$F = \frac{3\pi}{2\tau}(\psi_{\alpha 1} i_{\beta 1} - \psi_{\beta 1} i_{\alpha 1}) \qquad (6)$$

where $\tau$ represents the pole pitch of the motor.

In the conventional model prediction thrust control algorithm, the objective function includes two terms: thrust control and flux linkage control containing different dimensions. Therefore, it is necessary to adjust the weight coefficient to balance the two control targets. In order to eliminate the weight coefficient, the flux linkage tracking term is replaced with a conjugate thrust term, so that the dimensions of the objective function are unified. The conjugate thrust is expressed as:

$$\overline{F} = \frac{3\pi}{2\tau}(\psi_{\alpha 1} i_{\alpha 1} + \psi_{\beta 1} i_{\beta 1}) \qquad (7)$$

In order to predict the thrust and the conjugate thrust, take the derivative of the equations (6) and (7) to obtain:

$$\begin{cases} \frac{dF}{dt} = \frac{3\pi}{2\tau}\left(\frac{d\psi_{\alpha 1}}{dt} i_{\beta 1} + \psi_{\alpha 1} \frac{di_{\beta 1}}{dt} - \frac{d\psi_{\beta 1}}{dt} i_{\alpha 1} - \psi_{\beta 1} \frac{di_{\alpha 1}}{dt}\right) \\ \frac{d\overline{F}}{dt} = \frac{3\pi}{2\tau}\left(\frac{d\psi_{\alpha 1}}{dt} i_{\alpha 1} + \psi_{\alpha 1} \frac{di_{\alpha 1}}{dt} + \frac{d\psi_{\beta 1}}{dt} i_{\beta 1} + \psi_{\beta 1} \frac{di_{\beta 1}}{dt}\right) \end{cases} \qquad (8)$$

Meanwhile, due to the delay caused by the calculation time of the microprocessor, further prediction is needed to compensate for the impact of this delay. A value obtained by sampling the current timing k is used to predict the timing k+1, and the prediction expression is as below:

$$\begin{cases} i_{\alpha 1(k+1)} = \lambda T_s(R_2 \psi_{\alpha 1(k)} + L_r u_{\alpha 1(k)} - L_r \omega_2 \psi_{\beta 1(k)}) + \\ \quad (1 - \lambda \gamma T_s) i_{\alpha 1(k)} + \omega_2 T_s i_{\beta 1(k)} \\ i_{\beta 1(k+1)} = \lambda T_s(R_2 \psi_{\beta 1(k)} + L_r u_{\beta 1(k)} - L_r \omega_2 \psi_{\alpha 1(k)}) + \\ \quad (1 - \lambda \gamma T_s) i_{\beta 1(k)} + \omega_2 T_s i_{\alpha 1(k)} \\ \psi_{\alpha 1(k+1)} = \psi_{\alpha 1(k)} + (u_{\alpha 1(k)} - R_1 i_{\alpha 1(k)}) T_s \\ \psi_{\beta 1(k+1)} = \psi_{\beta 1(k)} + (u_{\beta 1(k)} - R_1 i_{\beta 1(k)}) T_s \end{cases} \qquad (9)$$

where subscripts k and k+1 represent state variables of the motor at the timings k and k+1, respectively; $T_s$ represents a sampling period; $u_{\alpha 1(k)}$ and $u_{\beta 1(k)}$ respectively represent $\alpha$ and $\beta$ axis components of the optimal voltage vector solved at the previous timing k−1.

By using the predicted value of the equation (9), the prediction expressions of the thrust and conjugate thrust at the timing k+1 can be obtained as follows:

$$\begin{cases} F_{(k+1)} = \dfrac{3\pi}{2\tau}(\psi_{\alpha 1(k+1)} i_{\beta 1(k+1)} - \psi_{\beta 1(k+1)} i_{\alpha 1(k+1)}) \\ \overline{F_{(k+1)}} = \dfrac{3\pi}{2\tau}(\psi_{\alpha 1(k+1)} i_{\alpha 1(k+1)} + \psi_{\beta 1(k+1)} i_{\beta 1(k+1)}) \end{cases} \quad (10)$$

According to the equation (8), the change rates of the thrust and the conjugate thrust at the timing k+1 are expressed as:

$$\begin{cases} \dfrac{dF}{dt}\bigg|_{t=k+1}^{V_{k+1}} = \dfrac{3\pi}{2\tau}\left(\dfrac{d\psi_{\alpha 1}}{dt}\bigg|_{t=k+1}^{V_{k+1}} i_{\beta 1(k+1)} + \psi_{\alpha 1(k+1)}\dfrac{di_{\beta 1}}{dt}\bigg|_{t=k+1}^{V_{k+1}} - \dfrac{d\psi_{\beta 1}}{dt}\bigg|_{t=k+1}^{V_{k+1}} i_{\alpha 1(k+1)} - \psi_{\beta 1(k+1)}\dfrac{di_{\alpha 1}}{dt}\bigg|_{t=k+1}^{V_{k+1}}\right) \\ \dfrac{d\overline{F}}{dt}\bigg|_{t=k+1}^{V_{k+1}} = \dfrac{3\pi}{2\tau}\left(\dfrac{d\psi_{\alpha 1}}{dt}\bigg|_{t=k+1}^{V_{k+1}} i_{\alpha 1(k+1)} + \psi_{\alpha 1(k+1)}\dfrac{di_{\alpha 1}}{dt}\bigg|_{t=k+1}^{V_{k+1}} + \dfrac{d\psi_{\beta 1}}{dt}\bigg|_{t=k+1}^{V_{k+1}} i_{\beta 1(k+1)} + \psi_{\beta 1(k+1)}\dfrac{di_{\beta 1}}{dt}\bigg|_{t=k+1}^{V_{k+1}}\right) \end{cases} \quad (11)$$

where $V_{k+1}$ represents a voltage vector solved at the current timing k, and the change rates of the current and the flux linkage can be expressed as:

$$\begin{cases} \dfrac{di_{\alpha 1}}{dt}\bigg|_{t=k+1}^{V_{k+1}} = \lambda\left(\dfrac{R_2 \psi_{\alpha 1(k+1)} - \gamma i_{\alpha 1(k+1)} +}{L_r u_{\alpha 1(k+1)} + L_r \omega_2 \psi_{\beta 1(k+1)}}\right) - \omega_2 i_{\beta 1(k+1)} \\ \dfrac{di_{\beta 1}}{dt}\bigg|_{t=k+1}^{V_{k+1}} = \lambda\left(\dfrac{R_2 \psi_{\beta 1(k+1)} - \gamma i_{\beta 1(k+1)} +}{L_r u_{\beta 1(k+1)} + L_r \omega_2 \psi_{\alpha 1(k+1)}}\right) + \omega_2 i_{\alpha 1(k+1)} \\ \dfrac{d\psi_{\alpha 1}}{dt}\bigg|_{t=k+1}^{V_{k+1}} = u_{\alpha 1(k+1)} - R_1 i_{\alpha 1(k+1)} \\ \dfrac{d\psi_{\beta 1}}{dt}\bigg|_{t=k+1}^{V_{k+1}} = u_{\beta 1(k+1)} - R_1 i_{\beta 1(k+1)} \end{cases} \quad (12)$$

where $u_{\alpha 1(k+1)}$ and $u_{\beta 1(k+1)}$ respectively represent $\alpha$ and $\beta$ axis components of a voltage vector $V_{k+1}$ solved at the current timing k.

Further, the thrust and the conjugate thrust at a timing k+2 are expressed as:

$$\begin{cases} F_{(k+2)} = F_{(k+1)} + T_s \dfrac{dF}{dt}\bigg|_{t=k+1}^{V_{k+1}} \\ \overline{F_{(k+2)}} = \overline{F_{(k+1)}} + T_s \dfrac{d\overline{F}}{dt}\bigg|_{t=k+1}^{V_{k+1}} \end{cases} \quad (13)$$

Figure 2:
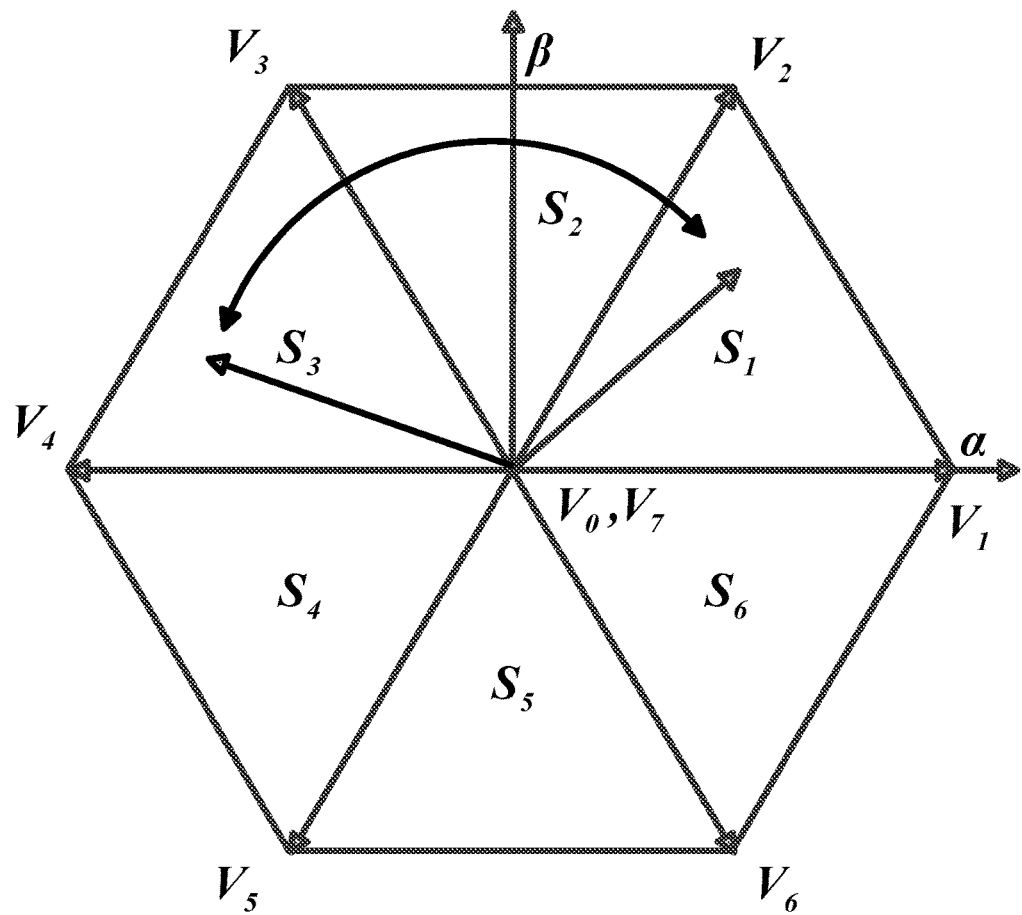
FIG. 2 shows an output voltage vector of a two-level inverter.

For the double vector modulation strategy, two voltage vectors are used in each switching period, that is, the solved voltage vector can be expressed as:

$$V_{k+1} = d V_i + (1-d) V_j \quad (14)$$

where d represents a duty cycle between two voltage vectors, $V_i$ and $V_j$ represent 8 basic voltage vectors $V_0 \ldots V_7$ output by the two-level inverter, as shown in FIG. 2.

In order to further improve the performance of the double vector modulation algorithm, a combination of any two voltage vectors is adopted instead of the traditional fixed combination of a non-zero voltage vector and a zero voltage vector, so that there will be 7×7=49 possible combinations. In this case, it is necessary to evaluate these possible combinations one by one through the objective function to select a combination that minimizes the value of the objective function, and then solve an optimal duty cycle. The objective function can be expressed as:

$$J = (F^* - F_{(k+2)})^2 + (\overline{F^*} - \overline{F_{(k+2)}})^2 \quad (15)$$

where $F^*$ represents a thrust reference value generated by a speed loop proportional-integral (PI) regulator; and $\overline{F^*}$ represents a conjugate thrust reference value generated by a flux linkage loop PI regulator.

Second: Simplification of the Solution Process

In the conventional solution process, 49 possible combinations needs to be compared and evaluated one by one, which leads to heavy online calculation. In order to simplify this solution process, the present disclosure derives a reference voltage vector, and uses the voltage vector to guide the search process, so that the optimal voltage vector combination can be directly searched out, and then the duty cycle between the two voltage vectors is calculated.

Therefore, it is assumed that there is a voltage vector which enables the value of the objective function to be zero, i.e., no tracking error, then the thrust and the conjugate thrust are expressed as:

$$\begin{cases} F_{(k+2)} = F_{(k+1)} + T_s \dfrac{dF}{dt}\bigg|_{t=k+1}^{V^*_{k+1}} = F^* \\ \overline{F_{(k+2)}} = \overline{F_{(k+1)}} + T_s \dfrac{d\overline{F}}{dt}\bigg|_{t=k+1}^{V^*_{k+1}} = \overline{F^*} \end{cases} \quad (16)$$

where $V^*_{k+1}$ represents a reference voltage vector to be solved.

By solving the above equation, this voltage vector (i.e., the reference voltage vector) can be expressed as:

$$\begin{cases} u^*_{\alpha 1(k+1)} = \dfrac{D(F^* - F_{(k+1)}) - E_1 T_s) - B(\overline{F^*} - \overline{F_{(k+1)}}) - E_2 T_s)}{(AD - BC) T_s} \\ u^*_{\beta 1(k+1)} = \dfrac{D(\overline{F^*} - \overline{F_{(k+1)}}) - E_1 T_s) - B(F^* - F_{(k+1)}) - E_2 T_s)}{(AD - BC) T_s} \end{cases} \quad (17)$$

where $$\begin{cases} A = \dfrac{3\pi}{2\tau}(i_{\beta 1(k+1)} - \lambda L_r \psi_{\beta 1(k+1)}) \\ B = -\dfrac{3\pi}{2\tau}(i_{\alpha 1(k+1)} - \lambda L_r \psi_{\alpha 1(k+1)}) \\ C = \dfrac{3\pi}{2\tau}(i_{\alpha 1(k+1)} + \lambda L_r \psi_{\alpha 1(k+1)}) \\ D = \dfrac{3\pi}{2\tau}(i_{\beta 1(k+1)} + \lambda L_r \psi_{\beta 1(k+1)}) \\ E_1 = -\dfrac{3\pi}{2\tau}\lambda L_r \omega_2 (\psi_{\alpha 1(k+1)}^2 + \psi_{\beta 1(k+1)}^2) - \lambda \gamma F_{(k+1)} + \omega_2 \overline{F_{(k+1)}} \\ E_2 = -\dfrac{3\pi}{2\tau}\left[\begin{array}{l} R_1(i_{\alpha 1(k+1)}^2 + i_{\beta 1(k+1)}^2) + \\ \lambda R_2(\psi_{\alpha 1(k+1)}^2 + \psi_{\beta 1(k+1)}^2) \end{array}\right] - \lambda \gamma \overline{F_{(k+1)}} - \omega_2 F_{(k+1)} \end{cases}$$

Since the reference voltage vector can achieve zero tracking error, only a voltage vector closest to the reference voltage needs to be searched out, and the objective function can be rewritten as:

$$J = (u^*_{\alpha 1(k+1)} - u_{\alpha 1(k+1)})^2 + (u^*_{\beta 1(k+1)} - u_{\beta 1(k+1)})^2 \quad (18)$$

As shown in FIG. 2, the output voltage range of the two-level inverter can be divided into 6 different sectors.

Further, voltage vectors in other sectors can be transformed into the first sector by rotation, and expressed as:

$$T = \begin{bmatrix} \cos\left(\frac{(n-1)\pi}{3}\right) & \sin\left(\frac{(n-1)\pi}{3}\right) \\ -\sin\left(\frac{(n-1)\pi}{3}\right) & \cos\left(\frac{(n-1)\pi}{3}\right) \end{bmatrix} \quad (19)$$

where n represents a sector where the voltage vector is located.

Figure 3:
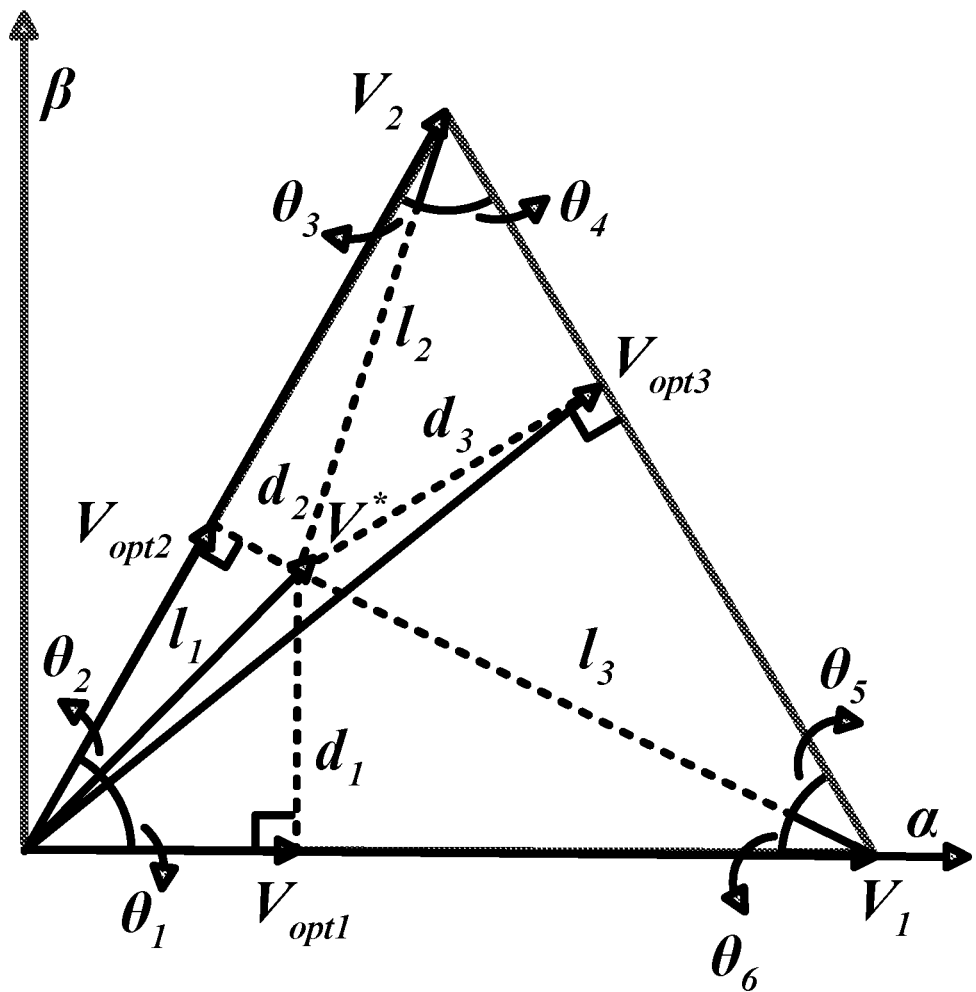
FIG. 3 shows a case where a reference voltage vector is located within the modulation range of a first sector.

Therefore, it is only necessary to analyze the first sector, and other sectors are similar. When the reference voltage vector is in the first sector, as shown in FIG. 3, voltage vector combinations in the other sectors can be excluded since they are farther from the reference voltage vector than the first sector combination is. In this case, only three different voltage vector combinations of $V_1$, $V_{07}$, $V_2$, $V_{07}$ and $V_1$, $V_2$ are needed to be considered. Shortest distances from the three different voltage vector combinations to the reference voltage vector are vertical distances, which can be expressed as:

$$\begin{cases} d_1 = l_1 \sin(\theta_1) = l_3 \sin(\theta_6) \\ d_2 = l_1 \sin(\theta_2) = l_2 \sin(\theta_3) \\ d_3 = l_2 \sin(\theta_4) = l_3 \sin(\theta_5) \end{cases} \quad (20)$$

where $d_1$ represents a vertical distance from the voltage vector combination of $V_1$, $V_{07}$ to the reference voltage vector, $d_2$ represents a vertical distance from the vector combination of $V_2$, $V_{07}$ to the reference voltage vector, and $d_3$ represents a vertical distance from the vector combination of $V_1$, $V_2$ to the reference voltage vector. Angles of $\theta_1 \ldots \theta_6$ are defined as shown in FIG. 3.

Figure 4:
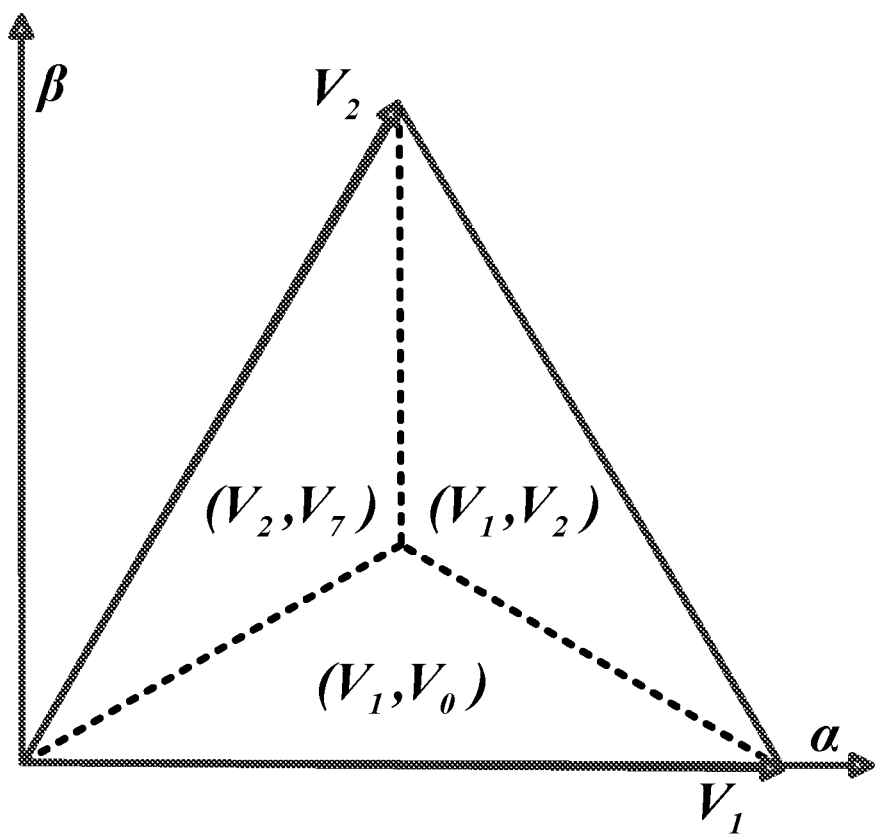
FIG. 4 shows a region division of different combinations in the first sector.

It can be seen from the equation (20) that the shortest distances from the three different voltage vector combinations to the reference voltage vector are related to the angles. When $\theta_1 > \theta_2$, $\theta_4 > \theta_3$ and $\theta_5 > \theta_6$, $d_2 < d_1 < d_3$ can be deduced according to the equation (20), and thus, the optimal voltage vector combination is $V_2$, $V_{07}$, which has the shortest vertical distance, so that the value of the rewritten objective function (18) is minimized. When $\theta_1 = \theta_2$, $\theta_4 = \theta_3$, and $\theta_5 = \theta_6$, vertical distances from the three voltage vector combinations to the reference voltage vector are equal, that is, angle bisectors of three inner corners of the triangle are their boundaries. Therefore, in the first sector, a region of three different voltage vector combinations is selected as shown in FIG. 4.

Figure 5:
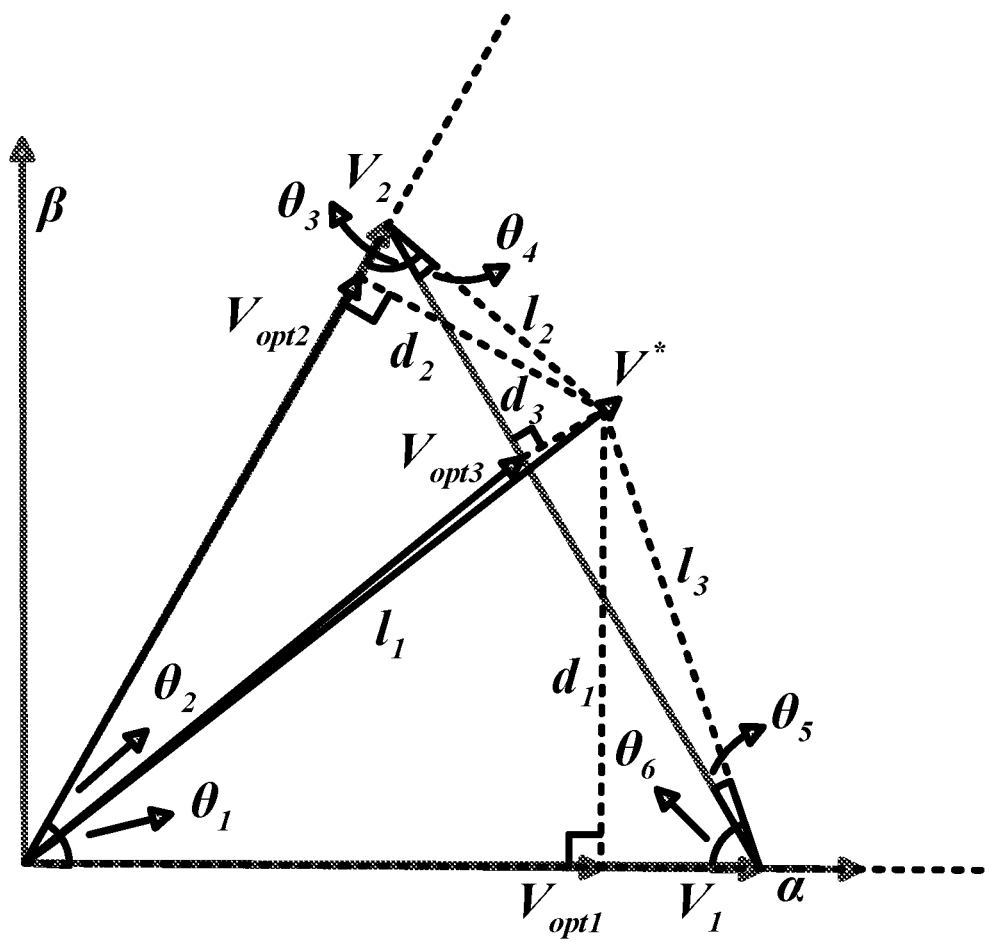
FIG. 5 shows a case where a reference voltage vector exceeds the output voltage range of the inverter.
Figure 6:
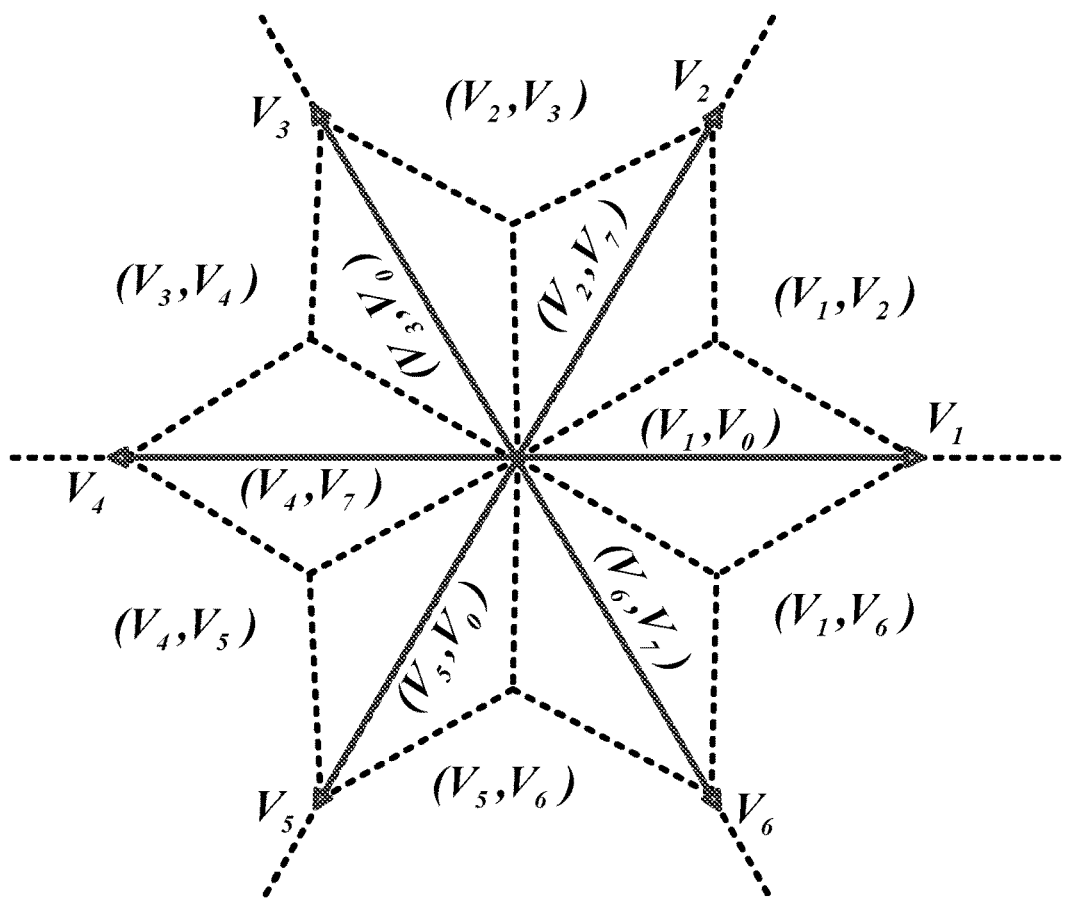
FIG. 6 shows a distribution region map of an optimal voltage vector combination.
Figure 7:
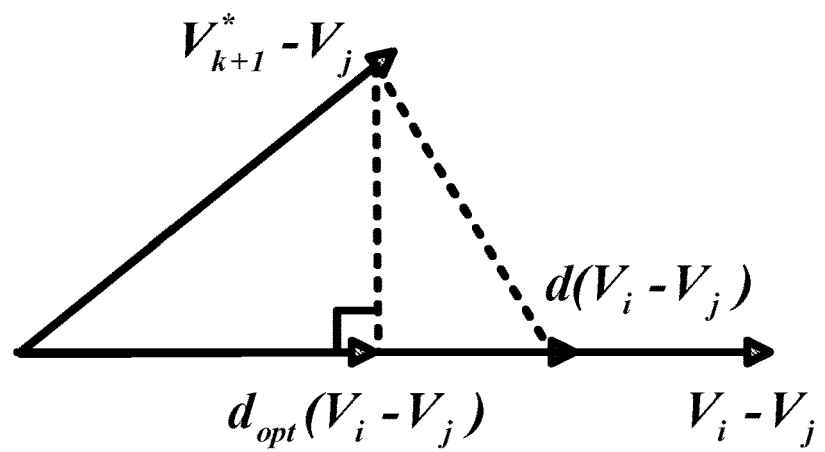
FIG. 7 shows a solution of an optimal duty cycle.

The reference voltage vector may exceed the output voltage range of the inverter, as shown in FIG. 5. As can be seen from the figure, in this case, $\theta_3 > \theta_4$ and $\theta_6 > \theta_5$ always hold. Therefore, $d_3 < d_2$ and $d_3 < d_1$ can be deduced through the equation (20), and thus the optimal voltage vector combination should be $V_1$, $V_2$. Similarly, by analyzing other sectors, a regional distribution map of the optimal voltage vector combinations can be obtained as shown in FIG. 6. Therefore, it is only necessary to determine which region the reference voltage vector belongs to, and then the optimal voltage vector combination can be directly selected without the need to compare one by one, which greatly reduces the calculation amount.

After selecting the optimal voltage combination, it is necessary to determine the optimal duty cycle between the two voltage vectors. At this time, we can solve the optimal duty cycle according to the equation (18). The equation (18) can be written in a form of vector expression as follow:

$$J = \|V^*_{k+1} - V_{k+1}\|^2 = \|V^*_{k+1} - (dV_i + (1-d)V_j)\|^2 \Rightarrow J = \|(V^*_{k+1} - V_j) - d(V_i - V_j)\|^2 \quad (21)$$

It can be seen from the formula (21) that when it is necessary to adjust the duty cycle d to minimize the distance between the voltage vectors $V^*_{k+1} - V_j$ and $d(V_i - V_j)$, we only need to project the voltage vector $V^*_{k+1} - V_j$ onto the voltage vector $(V_i - V_j)$, and then the optimal duty cycle can be expressed as:

$$d_{opt} = \frac{(V^*_{k+1} - V_j) \cdot (V_i - V_j)}{\|V_i - V_j\|^2} \quad (22)$$

where · represents a dot product between two voltage vectors, and $\|V\|$ represents a length of a voltage vector.

The voltage vector combination can be divided into two categories: one is a combination of a non-zero voltage vector and a zero voltage vector; and the other is a combination of two non-zero voltage vectors. When it is the previous combination, since there is a zero voltage vector, the equation (22) can be simplified as:

$$d_{opt\text{-}NZ} = \frac{V^*_{k+1} \cdot V_{NVV}}{\|V_{NVV}\|^2} \quad (23)$$

where $V_{NVV}$ represents a non-zero voltage vector $V_1$ or $V_2$.

Similarly, when the voltage vector combination is a combination of two non-zero voltage vectors, the optimal duty cycle can be expressed as:

$$d_{opt\text{-}NZ} = \frac{(V^*_{k+1} \cdot V_1) \cdot (V_2 - V_1)}{\|V_2 - V_1\|^2} \quad (24)$$

Figure 8:
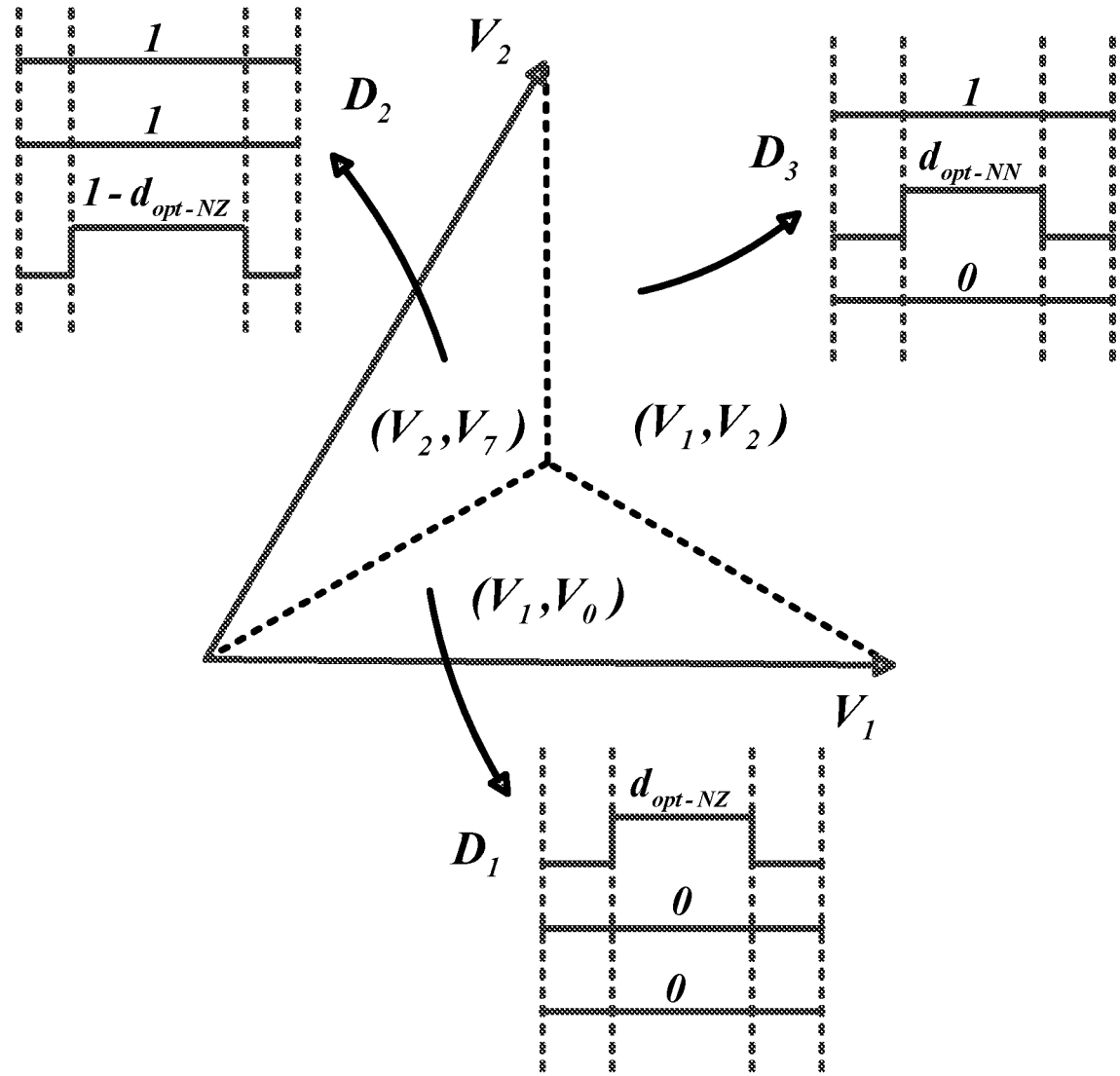
FIG. 8 shows three-phase bridge arm pulses in the first sector.

Further, pulses of the three-phase bridge arms are allocated according to the previously solved optimal voltage vector combination and optimal duty cycle between them, so that the three-phase bridge arms only need to act once in a switching cycle, and the other bridge arms are kept high or low as shown in FIG. 8.

In a case of the combination of two non-zero voltage vectors, since there exists only one different switching pulse for the two non-zero voltage vectors, a switching pulse of only one bridge arm needs to be changed, as shown below.

$$V^{opt}_{k+1}(S_a, S_b, S_c) = d_{opt\text{-}NN} V_2(110) + (1 - d_{opt\text{-}NN}) V_1(100) \quad (25)$$

$$= (1, d_{opt\text{-}NN}, 0) \quad RVV \in D_3$$

In a case of the combination of a non-zero voltage vector and a zero voltage vector, since there are two different zero voltage vectors $V_0$ (000) and $V_7$(111), it is necessary to select a suitable zero voltage vector according to different situations such that in a switching cycle, the three-phase bridge arms act only once, as shown below.

$$\begin{cases} V_{k+1}^{opt}(S_a, S_b, S_c) = d_{opt-NZ}V_1(100) + (1 - d_{opt-NZ})V_0(000) = \\ \quad (d_{opt-NZ}, 0, 0) \quad RVV \in D_1 \\ V_{k+1}^{opt}(S_a, S_b, S_c) = d_{opt-NZ}V_2(110) + (1 - d_{opt-NZ})V_7(111) = \\ \quad (1, 1, (1 - d_{opt-NZ})) \quad RVV \in D_2 \end{cases} \quad (26)$$

Figure 9:
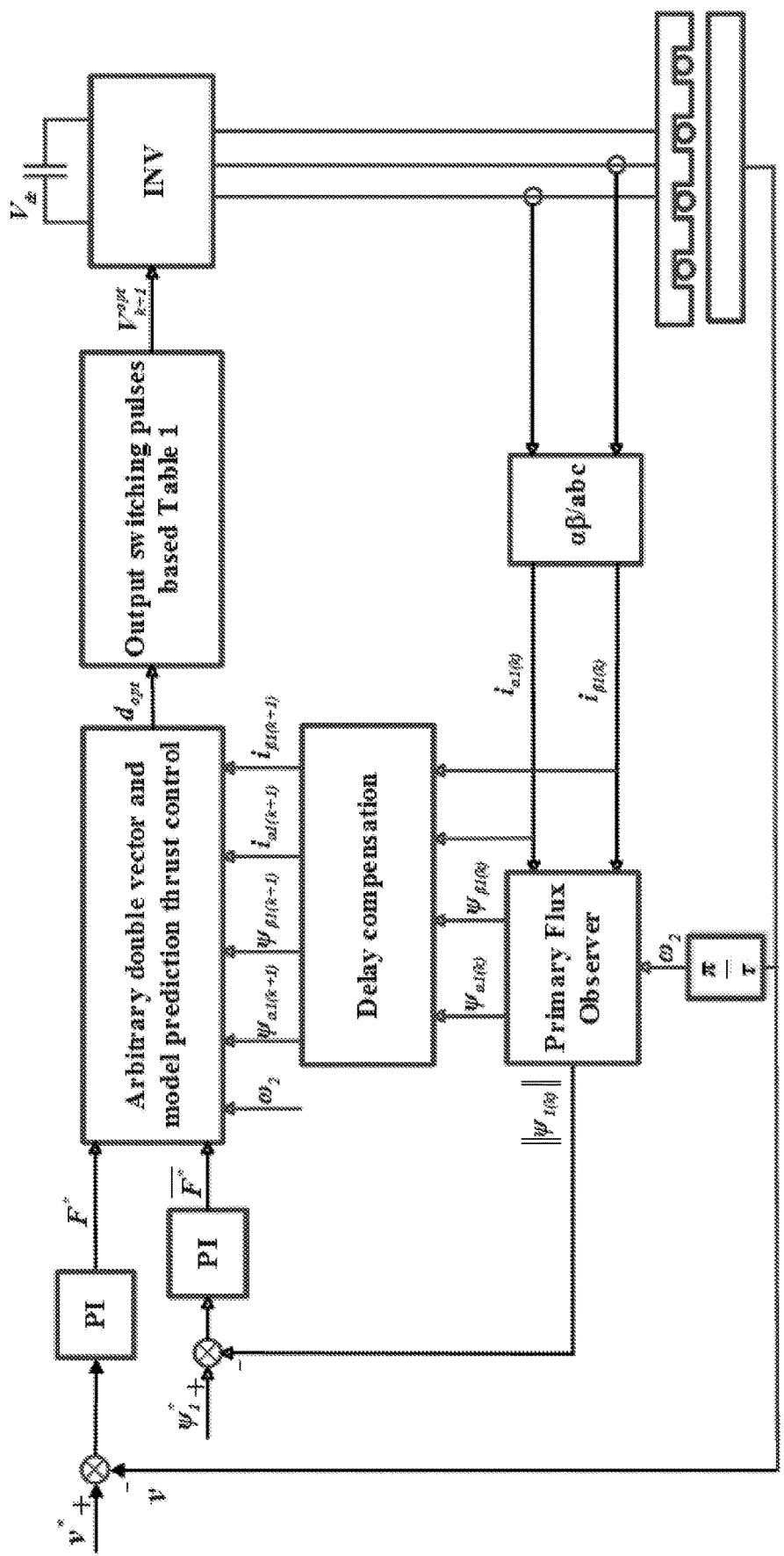
FIG. 9 shows an overall control block diagram of a system.

In different sectors, different voltage vector combinations and pulses of the three-phase bridge arms are as shown in FIG. 1. Therefore, it is only necessary to determine a region to which the reference voltage vector belongs, and then search for the solution result according to Table 1, which eliminates the need for complicated and repeated calculations, thereby greatly reducing the arbitrary double vector and model prediction thrust control algorithm. In the end, an overall control block diagram of the system is shown in FIG. 9.

| Sector | Region | Vector combination | Switching pulse |
|---|---|---|---|
| $S_1$ | $D_1$ | $V_1, V_0$ | $(d_{opt-NZ}, 0, 0)$ |
|  | $D_2$ | $V_2, V_7$ | $(1, 1, (1-d_{opt-NZ}))$ |
|  | $D_3$ | $V_1, V_2$ | $(1, d_{opt-NN}, 0)$ |
| $S_2$ | $D_1$ | $V_2, V_7$ | $(1, 1, (1-d_{opt-NZ}))$ |
|  | $D_2$ | $V_3, V_0$ | $(0, d_{opt-NZ}, 0)$ |
|  | $D_3$ | $V_2, V_3$ | $((1- d_{opt-NN}), 1, 0)$ |
| $S_3$ | $D_1$ | $V_3, V_0$ | $(0, d_{opt-NZ}, 0)$ |
|  | $D_2$ | $V_4, V_7$ | $((1- d_{opt-NZ}), 1, 1)$ |
|  | $D_3$ | $V_3, V_4$ | $(0, 1, d_{opt-NN})$ |
| $S_4$ | $D_1$ | $V_4, V_7$ | $((1- d_{opt-NZ}), 1, 1)$ |
|  | $D_2$ | $V_5, V_0$ | $(0, 0, d_{opt-NZ})$ |
|  | $D_3$ | $V_4, V_5$ | $(0, (1- d_{opt-NN}), 1)$ |
| $S_5$ | $D_1$ | $V_5, V_0$ | $(0, 0, d_{opt-NZ})$ |
|  | $D_2$ | $V_6, V_7$ | $(1, (1- d_{opt-NZ}), 1)$ |
|  | $D_3$ | $V_5, V_6$ | $(d_{opt-NN}, 0, 1)$ |
| $S_6$ | $D_1$ | $V_6, V_7$ | $(1, (1- d_{opt-NZ}), 1)$ |
|  | $D_2$ | $V_1, V_0$ | $(d_{opt-NZ}, 0, 0)$ |
|  | $D_3$ | $V_1, V_6$ | $(1, 0, (1- d_{opt-NN}))$ |

It should be readily understood to those skilled in the art that the above description is only preferred embodiments of the present disclosure, and does not limit the scope of the present disclosure. Any change, equivalent substitution and modification made without departing from the spirit and scope of the present disclosure should be included within the scope of the protection of the present disclosure.

What is claimed is:

1. An arbitrary double vector and model prediction thrust control method for a linear induction motor, adapted to an arbitrary double vector and model prediction thrust control system for the linear induction motor, wherein the arbitrary double vector and model prediction thrust control system for the linear induction motor comprising a speed loop PI regulator, a flux linkage loop PI regulator and a controller, wherein the speed loop PI regulator is configured to generate a thrust reference value, the flux linkage loop PI regulator and the controller are configured to generate a conjugate thrust reference value, and the controller is configured to perform the method, the method comprising following steps:

(1) sampling a current and a running linear velocity of the linear induction motor at a current timing k;

(2) predicting a thrust and a conjugate thrust of the linear induction motor at a current timing k+1 according to the sampled values at the current timing k;

(3) solving an optimal voltage vector combination at the current timing k+1 by taking the predicted thrust and conjugate thrust of the linear induction motor at the current timing k as target values; and (4) calculating an optimal duty cycle for the optimal voltage vector combination, and allocating pulses of three-phase bridge arms, wherein an equation for calculating the thrust and conjugate thrust of the linear induction motor is expressed as:

$$\begin{cases} F_{(k+1)} = \dfrac{3\pi}{2\tau}(\psi_{\alpha 1(k+1)}i_{\beta 1(k+1)} - \psi_{\beta 1(k+1)}i_{\alpha 1(k+1)}) \\ \overline{F_{(k+1)}} = \dfrac{3\pi}{2\tau}(\psi_{\alpha 1(k+1)}i_{\alpha 1(k+1)} + \psi_{\beta 1(k+1)}i_{\beta 1(k+1)}) \end{cases},$$

wherein $$\begin{cases} i_{\alpha 1(k+1)} = \lambda T_s \left( \dfrac{R_2 \psi_{\alpha 1(k)} + L_r u_{\alpha 1(k)} +}{L_r \omega_2 \psi_{\beta 1(k)}} \right) + \\ \quad (1 - \lambda \gamma T_s)i_{\alpha 1(k)} - \omega_2 T_2 i_{\beta 1(k)} \\ i_{\beta 1(k+1)} = \lambda T_s \left( \dfrac{R_2 \psi_{\beta 1(k)} + L_r u_{\beta 1(k)} -}{L_r \omega_2 \psi_{\alpha 1(k)}} \right) +, \\ \quad (1 - \lambda \gamma T_s)i_{\beta 1(k)} + \omega_2 T_2 i_{\alpha 1(k)} \\ \psi_{\alpha 1(k+1)} = u_{\alpha 1(k)} + (u_{\alpha 1(k)} - R_1 i_{\alpha 1(k)})T_s \\ \psi_{\beta 1(k+1)} = u_{\beta 1(k)} + (u_{\beta 1(k)} - R_1 i_{\beta 1(k)})T_s \end{cases}$$

$F_{(k+1)}$ represents the thrust of the linear induction motor, $\overline{F_{(k+1)}}$ represents the conjugate thrust of the linear induction motor, $R_1$ and $R_2$ represent primary and secondary resistances of the linear induction motor, respectively; $i_{\alpha 1}$ and $i_{\beta 1}$ represent $\alpha$ $\alpha$ and $\beta$ axis components of a primary current of the linear induction motor, respectively;

$i_{\alpha 1}$ and $i_{\beta 1}$ represent $\alpha$ and $\beta$ axis components of a secondary current of the linear induction motor, respectively; $\psi_{\alpha 1}$ and $\psi_{\beta 1}$ represent $\alpha$ and $\beta$ axis components of a primary flux linkage of the linear induction motor, respectively; $\omega_2$ represents a secondary angular velocity; terms including subscripts (k) and (k+1) represent state variables of the linear induction motor at the current timings k and k+1, respectively;

$$\lambda = \dfrac{1}{L_s L_r - L'^2_m},$$

where $L_r$ represents a secondary inductance, $L_s$ represents a primary inductance, and $L'_m$ represents a modified mutual inductance of the linear induction motor; and T represents a pole pitch of the linear induction motor.

2. The arbitrary double vector and model prediction thrust control method for the linear induction motor according to claim 1, wherein a solving process of the step (3) is as follows:

(31) solving a reference voltage vector $V^*_{k+1}$:

$$\begin{cases} u^*_{\alpha 1(k+1)} = \dfrac{D(F^* - F_{(k+1)} - E_1 T_s) - B(\overline{F^*} - \overline{F_{(k+1)}} - E_2 T_s)}{(AD - BC)T_s} \\ u^*_{\beta 1(k+1)} = \dfrac{D(\overline{F^*} - \overline{F_{(k+1)}} - E_1 T_s) - B(\overline{F^*} - \overline{F_{(k+1)}} - E_1 T_s)}{(AD - BC)T_s} \end{cases},$$

where $$\begin{cases} A = \dfrac{3\pi}{2\tau}(i_{\beta 1(k+1)} - \lambda L_r \psi_{\beta 1(k+1)}) \\ B = -\dfrac{3\pi}{2\tau}(i_{\alpha 1(k+1)} - \lambda L_r \psi_{\alpha 1(k+1)}) \\ C = \dfrac{3\pi}{2\tau}(i_{\alpha 1(k+1)} + \lambda L_r \psi_{\alpha 1(k+1)}) \\ D = \dfrac{3\pi}{2\tau}(i_{\beta 1(k+1)} + \lambda L_r \psi_{\beta 1(k+1)}) \\ E_1 = -\dfrac{3\pi}{2\tau}\lambda L_r \omega_2 (\psi^2_{\alpha 1(k+1)} + \psi^2_{\beta 1(k+1)}) - \\ \qquad \lambda \gamma F_{(k+1)} + \omega_2 \overline{F_{(k+1)}} \\ E_2 = -\dfrac{3\pi}{2\tau}\left[ \begin{array}{l} R_1(i^2_{\alpha 1(k+1)} + i^2_{\beta 1(k+1)}) + \\ \lambda R_2(\psi^2_{\alpha 1(k+1)} + \psi^2_{\beta 1(k+1)}) \end{array} \right] - \\ \qquad \lambda \gamma \overline{F_{(k+1)}} - \omega_2 F_{(k+1)} \end{cases}$$

$u^*_{\alpha 1(k+1)}$ represents a α-axis component of the reference voltage vector $V^*_{k+1}$, $u^*_{\beta 1(k+1)}$ represents a β-axis component of the reference voltage vector $V^*_{k+1}$, $F^*$ represents the thrust reference value generated by the speed loop (PI) regulator, $\overline{F^*}$ represents the conjugate thrust reference value generated by the flux linkage loop PI regulator, $\gamma = L_s R_2 + L_r R_1$, and $T_s$ represents a sampling period; and

(32) evenly dividing an output voltage range of a two-level inverter into multiple regions, and determining which region the reference voltage vector $V^*_{k+1}$ belongs to, thereby obtaining a voltage vector combination corresponding to the region, which is the optimal voltage vector combination.

3. The arbitrary double vector and model prediction thrust control method for the linear induction motor according to claim 2, wherein the step (4) of calculating the optimal duty cycle is implemented as follow:

let the optimal voltage vector combination be expressed as $(V_i, V_j)$, then a calculation formula of the optimal duty cycle is:

$$d_{opt} = \frac{(V^*_{k+1} - V_j) \cdot (V_i - V_j)}{\|V_i - V_j\|^2},$$

wherein · represents a dot product between two voltage vectors, and $\|V\|$ represents a length of a voltage vector.

* * * * *